3,142,701
PREPARATION OF 2:5-DIBROMOTEREPHTHALIC ACID

Donald Graham Wilkinson, Manchester, England, assignor to Imperial Chemical Industries Limited, London, England, a corporation of Great Britain
No Drawing. Filed Mar. 12, 1962, Ser. No. 179,211
Claims priority, application Great Britain Apr. 5, 1961
5 Claims. (Cl. 260—515)

This invention relates to a halogenation process and more particularly it relates to a halogenation process for the manufacture of 2:5-dihalogenoterephthalic acids and esters.

2:5-dihalogenoterephthalic acids have hitherto been manufactured from 2:5-dihalogenodialkylbenzenes or 2:5-dihalogeno-4-carboxy-alkyl benzenes, either by direct oxidation of the alkyl groups to carboxy groups or by side-chain halogenation followed by hydrolysis. Thus for example, Wheeler and Morse (Journal of the American Chemical Society, volume 46, page 2574) oxidised 2:5-dichloro-p-xylene to 2:5-dichloroterephthalic acid with nitric acid, and Schultz (Berichte der Deutsche Gemischen Gesellschaft, volume 18, page 1762) oxidised 2:5-dibromo-p-toluic acid to 2:5-dibromoterephthalic acid with alkaline permanganate. French patent specification No. 663,791 describes the side-chain halogenation of 2:5-dihalogeno-1:4-dimethylbenzenes and the hydrolysis of the products to 2:5-dihalogenoterephthalic acids.

It has now been found that 2:5-dihalogenoterephthalic acids or esters may be economically manufactured directly from terephthalic acid. The manufacture of tetrahalogenoterephthalic acids has been described by Rupp (Berichte der Deutsche Gemischen Gesellschaft, 1896, volume 29, page 1629) but the manufacture of 2:5-dihalogenoterephthalic acids by direct halogenation is hitherto unknown.

According to the invention there is provided a process for the manufacture of 2:5-dihalogenoterephthalic acids which comprises treating an oleum solution of terephthalic acid with between 1.7 and 3.0 atomic proportions of bromine or iodine or between 4.0 and 5.0 atomic proportions of chlorine.

Although the strength of oleum used in the process of the invention is not critical it is found that halogenation proceeds only slowly in oleum containing less than about 10% of dissolved sulphur trioxide (hereinafter referred to as 10% oleum). Oleum of between about 35 to 50% strength solidifies at ordinary atmospheric temperature and for this reason it is found most convenient to use, in the process of the invention oleum of 20 to 35% strength or of 50 to 60% strength.

Examples of halogens which may be used in the process of the invention are chlorine, bromine and iodine. Mixtures of halogens may be employed if desired. When chlorine or bromine is used as halogen the presence of a small quantity of iodine or other "halogen carrier" is beneficial, but not essential. If desired the halogen used in the process of the invention may be formed in situ, from a halide, for example sodium bromide.

Although between 1.7 and 3.0 atomic proportions of halogen may be used in the process of the invention it is generally preferred to employ slightly more than 2 atomic proportions (for example from 2.0 to 2.5 atomic proportions) of halogen, the exact amount depending upon the conditions under which the process is carried out.

Bromination of terephthalic acid according to the process of the invention may conveniently be carried out by gradually introducing bromine into a solution of terephthalic acid in oleum (for example in about 6 to 15 proportions by weight of oleum) at ordinary atmospheric temperature (for example 20 to 25° C.) and then slowly raising the temperature, for example to about 50° to 75° C. and preferably 60° to 70° C. for several hours.

Chlorination of terephthalic acid according to the process of the invention may be carried out by passing gaseous chlorine into an oleum solution of terephthalic acid at a somewhat elevated temperature, for example 120° to 150° C.

Iodination of terephthalic acid according to the process of the invention may be carried out by heating an oleum solution of terephthalic acid with iodine at an elevated temperature, for example 150° to 200° C.

After carrying out the process of the invention the 2:5-dihalogenoterephthalic acid may be isolated by pouring the oleum solution into water and filtering off the precipitate, washing and drying. Excellent yields of 2:5-dihalogenoterephthalic acids are obtained. If desired the products may be purified, for example by crystallisation or by fractional precipitation by adding water to the oleum solution, or by esterification, crystallisation of the ester and subsequent hydrolysis.

If desired, an alcohol, for example methyl or ethyl alcohol may be added to the oleum solution after halogenating a terephthalic acid according to the process of the invention. On heating to about 100° C. the ester is formed and may be isolated as described above.

2:5-dihalogenoterephthalic acids and esters are of value as intermediates in the chemical industry, particularly for the manufacture of dyestuffs and pigments, for example pigments of the linear quinacridone and benzobisthiachromone series.

The invention is illustrated, but not limited, by the following examples in which the parts and percentages are by weight.

*Example 1*

100 parts of terephthalic acid and 2 parts of iodine are dissolved in 800 parts of 50% oleum with stirring at 20 to 25° C. 104 parts of bromine (2.15 atomic proportions) are gradually added during ½ hour with good stirring keeping the temperature constant, by cooling when necessary. The mixture is heated during 1 hour to 65° to 70° C. and maintained at this temperature for 3 hours. It is then cooled, and poured on to ice and the precipitated 2:5-dibromoterephthalic acid is filtered off, washed free from acid and dried. The yield is 140 parts, containing 49% or bromine (theory 49.4%). Esterification of the product with methyl alcohol and sulphuric acid gives 143.5 parts of dimethyl 2:5-dibromoterephthalate having a melting point of 128° to 130° C. Recrystallisation of the dimethyl ester from ethyl alcohol gives 115.5 parts having a melting point of 138 to 140° C. and containing 45.9% of bromine (theory 45.4%).

If 25% oleum is used in place of 50% oleum in this example and the mixture is heated at 60 to 65° for 28 hours, 141 parts of crude 2:5-dibromoterephthalic acid are obtained, containing 44.1% of bromine. Esterification of the crude product, and crystallisation of the ester gives 128 parts of dimethyl 2:5-dibromoterephthalate having a melting point of 136° to 142° C.

*Example 2*

50 parts of terephthalic acid and 1 part of iodine are dissolved in 400 parts of 40% oleum with stirring at 20 to 25° C. 67 parts of sodium bromide (2.15 atomic proportions) are gradually added during 1 hour, keeping the temperature constant by cooling, and the temperature is then raised during 1 hour to 65° C. and the mixture is stirred at this temperature for a further 18 hours. It is then cooled, poured on to ice and the precipitated 2:5-dibromoterephthalic acid is filtered, washed and dried.

73.5 parts are obtained containing 41% of bromine and esterification with methyl alcohol and sulphuric acid gives 73 parts of dimethyl 2:5-dibromoterephthalate having a melting point of 110° to 123° C. Recrystallisation of the dimethyl ester twice from ethyl alcohol gives 52 parts having a melting point of 135° to 143° C. and containing 45.6% of bromine.

*Example 3*

60 parts of terephthalic acid dissolved in 400 parts of 50% oleum and 52 parts of bromine (2.15 atomic proportions) are added during ½ hour keeping the temperature at 20° to 25° C. by cooling. The temperature is slowly raised to between 63° and 67° C. during 1 hour, and the mixture is then stirred at this temperature for 20 hours. 2:5-dibromoterephthalic acid is isolated from the mixture by the procedure described in Example 1. Yield 62 parts, containing 45.8% of bromine. Esterification and recrystallisation of the product gives 45.5 parts of dimethyl 2:5-dibromoterephthalate (melting point 143 to 146° C.).

*Example 4*

50 parts of terephthalic acid and 1 part of iodine are dissolved in 400 parts of 50% oleum and 73 parts of bromine (3.0 atomic proportions) are added during 20 minutes keeping the temperature at 20° to 25° C. The temperature is then raised to between 63 to 67° C. during 1 hour and the mixture is stirred at this temperature for 20 hours. The crude 2:5-dibromoterephthalic acid is isolated as in Example 1. Yield 72 parts, containing 50.5% of bromine. Eesterification and crystallisation of the product gives 57 parts of dimethyl 2:5-dibromoterephthalate (melting moint 139° to 145° C.).

*Example 5*

Bromination of terephthalic acid is carried out in 25% oleum as described in Example 1. The reaction mixture is cautiously added with cooling to 3800 parts of methanol and the resulting solution is stirred at the boil for 4 hours. It is then cooled and poured into water, the crude ester is filtered off, freed from dibromoterephthalic acid by extraction with dilute sodium carbonate solution, filtered, washed and dried. 125 parts of dimethyl ester of melting point 126° to 134° are obtained. By crystallisation from ethanol, 91 parts of dimethyl 2:5-dibromoterephthalate of melting point 135° C to 142° C. are obtained.

*Example 6*

50 parts of terephthalic acid are added with cooling and stirring to 400 parts of 25% oleum, keeping the temperature at 20° to 25° C. 2 parts of iodine are added and dry chlorine is passed in at 125° C. until an increase in weight of 50 parts has been obtained. The mixture is then added to excess ice, and the precipitated acid is filtered off, washed free from mineral acid and dried. It is converted into the dimethyl ester by stirring at the boil under reflux condenser with 560 parts of methanol and 18 parts of concentrated sulphuric acid for 20 hours. The dimethyl ester is isolated by dilution with water after removal of the excess methanol by distillation. The slurry is made alkaline with sodium carbonate and the crude ester after filtration further purified by recrystallisation from ethanol. Dimethyl 2:5-dichloroterephthalate, melting point 134° to 137° C. containing 26.2% chlorine is so obtained.

*Example 7*

A mixture of 50 parts of terephthalic acid, 77 parts of iodine and 150 parts of 50% oleum are stirred at 110° to 120° C. for 1½ hours, then at 140° to 160° C. for 1 hour and finally at 160° to 200° C. for 20 minutes. On cooling the mass is added to excess ice, the crude iodinated product is filtered off, washed free from mineral acid. It is purified by dissolving in dilute sodium carbonate solution, filtering and precipitating from the filtrate by addition of dilute hydrochloric acid. The iodo-acid is then filtered off, washed and dried. The yield is 100 parts containing 50.9% of iodine. Dimethyl 2:5-diiodoterephthalate is made by stirring 50 parts of the above product with 415 parts of thionyl chloride and 2 parts of pyridine at the boil for 20 hours, distilling off the excess thionyl chloride and boiling the residual acid chloride with 200 parts of methyl alcohol for 2 hours. The dimethyl ester is obtained by dilution with water and separated from any unreacted acid by treatment with sodium carbonate. It is then recrystallised from alcohol. It forms minute colourless prisms of melting point 161° to 163° C. and contains 57.6% of iodine ($C_{10}H_8O_4I_2$ requires 56.9% of iodine).

What I claim is:

1. A process for the manufacture of 2:5-dibromo terephthalic acids which comprises treating an oleum solution of terephthalic acid with 1.7 to 3.0 atomic proportions of bromine for each molecular proportion of terephthalic acid at a temperature of 50–75° C.
2. The process according to claim 1 wherein the oleum strength is 20 to 35%.
3. The process according to claim 1 wherein the oleum strength is 50 to 60%.
4. The process according to claim 1 wherein between 2.0 and 2.5 atomic proportions of bromine are used.
5. The process according to claim 1 wherein the temperature is between 60 and 70° C.

References Cited in the file of this patent
FOREIGN PATENTS
1,078,563    Germany _____ Mar. 31, 1960